(12) United States Patent
Tschantz (10) Patent No.: US 6,206,175 B1
(45) Date of Patent: Mar. 27, 2001

(54) CONVEYOR CLEANING AND AIR-BORNE RESIDUE CONTROL SYSTEM

(75) Inventor: Richard W. Tschantz, Louisville, OH (US)

(73) Assignee: Imperial Technologies Inc., North Canton, OH (US)

( * ) Notice: Subject to any disclaimer, the term of this patent is extended or adjusted under 35 U.S.C. 154(b) by 0 days.

(21) Appl. No.: 09/307,397

(22) Filed: May 7, 1999

Related U.S. Application Data

(60) Provisional application No. 60/084,703, filed on May 8, 1998.

(51) Int. Cl.[7] .............................. B65G 45/00; B65G 45/22
(52) U.S. Cl. ........................... 198/493; 198/495; 198/560
(58) Field of Search .................................. 198/493, 494, 198/495, 560

(56) References Cited

U.S. PATENT DOCUMENTS

| | | | | |
|---|---|---|---|---|
| 3,057,454 | * | 10/1962 | Frasch et al. | 198/560 X |
| 3,802,554 | * | 4/1974 | Paulsen et al. | 198/494 |
| 4,061,221 | * | 12/1977 | Higashinaka et al. | 198/494 X |
| 5,372,242 | * | 12/1994 | McInnes et al. | 198/495 |
| 5,372,243 | * | 12/1994 | King | 198/495 |
| 6,035,996 | * | 3/2000 | Swift | 198/495 X |

* cited by examiner

Primary Examiner—Christopher P. Ellis
Assistant Examiner—Gene O. Crawford
(74) Attorney, Agent, or Firm—Sand & Sebolt (57) ABSTRACT

A conveyor cleaning and residue control system for use with a conveyor includes an air knife and a deflector. The air knife impinges an air stream against the conveyor to blast residue from the conveyor, and the deflector redirects the air stream and the residue loosened by the air stream toward a chute. The flow of the air stream toward the chute causes at least a portion of the air-borne residue in the vicinity of the conveyor to flow toward the chute with the air stream such that the residue becomes supersaturated and forms macro-particles that precipitate out of air suspension. The air knife and deflector thus recycle the residue carried by the conveyor instead of requiring it to be evacuated. In the first embodiment, the deflector includes a pair of non-coplanar blades that are attached to one another. The deflector is both rotationally and translationally adjustable with respect to the conveyor. A second embodiment is disclosed wherein the deflector is curved. A third embodiment is disclosed wherein the deflector includes a servo mechanism that adjusts the orientation of the reflector with respect to the conveyor. A fourth embodiment is presented wherein the air knife and deflector are employed in a new construction material transport system that includes a shroud connected to the chute and an evacuation system connected to the downstream end of the shroud.

27 Claims, 5 Drawing Sheets

CONVEYOR CLEANING AND AIR-BORNE RESIDUE CONTROL SYSTEM

CROSS REFERENCE TO RELATED APPLICATIONS

This application claims the benefit of U.S. Provisional Application Serial No. 60/084,703 filed May 8, 1998, the disclosures of which are incorporated herein by reference.

BACKGROUND OF THE INVENTION

1. Technical Field

The invention relates generally to material transport systems and, more particularly, to a cleaning system that removes residue from a conveyor and controls the generation of air-borne residue particles. Specifically, the invention relates to a material transport system having an air knife that impinges an air stream against a conveyor to remove the residue therefrom and a deflector to deflect the air stream and air-borne residue toward a chute or hopper after the air stream has impinged on the conveyor. The invention also relates to the removal of air-borne residue particles from the area surrounding the conveyor.

2. Background Information

Material transport systems are used primarily for transporting materials from one location to another. Material transport systems typically include a conveyor, which may be any of a variety of structures such as endless conveyor belts, chain belts and feeders, vibrating feeder beds, and foldable belts, as well as other devices of the type known and understood in the relevant art. Most notably, material transport systems include a material discharge chute for collecting and sorting material, which chute relates to the present invention.

When the materials transported by the conveyor are of a particulate nature, such as coal or breakfast cereal, the conveyor becomes coated with a residue of fine particles of the particulate material. The residue is produced by the breakage of the particulate materials, friction between the particulate materials and the conveyor, friction between the individual particles themselves, as well as other phenomena. When the particulate material is of a powdered consistency, such as powdered lime, the powdered material itself is the residue that becomes coated on the conveyor.

Such residue sticks to the conveyor as a result of phenomena such as static electricity or trace amounts of oil or water disposed on the conveyor or contained in the air, as well as due to other phenomena. The residue is continuously deposited on the conveyor as a result of conveying the particulate materials and ultimately results in fouling of the conveyor and failure of the material transport system if allowed to remain on the conveyor without cleaning. Moreover, the residue must be removed from the conveyor inasmuch as such residue contributes to an overall dusty environment that is unsafe, unsanitary, and unattractive.

The coating of residue on the conveyor has often proven difficult to reliably and safely remove. Specifically, brushes and scrapers that attempt to frictionally dislodge the residue from the conveyor often are only partly effective and moreover dramatically increase conveyor wear. The need thus exists for a device that removes the residue from a conveyor without increasing the wear of the conveyor.

The residue produced in transporting the particulate materials is typically both air-borne as well as coated on the conveyor. Such air-borne residue is preferably controlled in some fashion to prevent the air-borne residue from fouling the air surrounding the material transport system and settling on the floor, machinery, and other objects around the material transport system. As is understood in the relevant art, a head cover is typically disposed over the terminal end of the conveyor where the particulate materials are discharged into a chute for transfer onto another conveyor or into a packaging system. The head cover typically surrounds the terminal end of the conveyor and includes an evacuation system such as a dust vacuum that draws the air-borne residue away from the terminal end of the conveyor and into appropriate containers for disposal or reintroduction into the system. Such evacuation systems are, however, expensive to operate inasmuch as the disposal or reintroduction of the collected residue requires additional material handling and cost, and results in generation of additional air-borne residue.

Most evacuation systems in existing material transport systems are attached at the uppermost portion of the head cover, with the result that the evacuation system draws air-borne residue in a direction away from the flow of particulate material, thus preventing the air-borne residue from settling out of air suspension and back into the particulate material. While the air-borne residue must be captured for reasons of conveyor reliability, safety, and hygiene, such caption generates an expense that is preferably minimized.

The head cover typically includes a chute disposed at the lower end into which the particulate material is discharged. As the particulate material falls into the chute, the evacuation system removes the air-borne residue from inside the head cover for disposal.

The removal of residue from the conveyor can contribute to the presence of air-borne residue particles. An increase in the quantity of air-borne residue caused during cleaning of the conveyor thus results in increased evacuation requirements. The need thus exists for a device that reliably removes the residue from a conveyor without increasing the quantity of air-borne residue. Such a device preferably reduces the quantity of air-borne residue within the head cover.

SUMMARY OF THE INVENTION

In view of the foregoing, an objective of the present invention is to provide a conveyor cleaning system that removes residue from a conveyor.

Another objective of the present invention is to provide a conveyor cleaning system that removes residue from a conveyor and controls the quantity of air-borne residue.

Another objective of the present invention is to provide a conveyor cleaning system that reduces the amount of air-borne residue at the terminal location of a conveyor.

Another objective of the present invention is to provide a conveyor cleaning system that reduces the quantity of air-borne residue that must be evacuated from the material transport system.

Another objective of the present invention is to provide a conveyor cleaning system that increases the quantity of residue that is recycled for use.

Another objective of the present invention is to provide a conveyor cleaning system that removes residue from a conveyor without increasing the wear of the conveyor.

Another objective of the present invention is to provide a conveyor cleaning system that dries the conveyor.

Another objective of the present invention is to provide a conveyor cleaning system that causes air-borne particles of residue to become supersaturated and precipitate out of air suspension.

These and other objectives and advantages are obtained by the improvement of the present invention, the general nature of which may be stated as relating to a material transport system of the type having a conveyor operatively terminating inside a head cover, the head cover including a chute, wherein the improvement comprises a source of air, an air knife, the source of air being in fluid communication with the air knife, the source of air adapted to supply air to the air knife, the air knife being operatively directed at the conveyor, the air knife impinging an air stream onto the conveyor, and a deflector, the deflector being disposed at an angle with respect to the conveyor, the deflector adapted to redirect the air stream toward the chute after the air stream has impinged on the conveyor.

Other objectives and advantages are obtained from the conveyor cleaning system of the present invention, the general nature of which may be stated as including a conveyor, a head cover surrounding at least a portion of the conveyor, the head cover including a chute, the chute adapted to receive particulate material after its discharge from the conveyor, a source of air, an air knife, the source of air being in fluid communication with the air knife, the source of air adapted to supply air to the air knife, the air knife being disposed adjacent the head cover and directed at the conveyor, the air knife impinging an air stream onto the conveyor, and a deflector adapted to redirect the air stream toward the chute after the air stream has impinged on the conveyor.

Still other objectives and advantages are obtained from the method for removing residue from a conveyor of the present invention, the general nature of which can be stated as comprising the steps of impinging an air stream onto the conveyor with an air knife and redirecting the air stream with a deflector after the air stream has impinged on the conveyor.

BRIEF DESCRIPTION OF THE DRAWINGS

The preferred embodiments of the invention, illustrative of the best modes in which applicant has contemplated applying the principles of invention, are set forth in the following description and are shown in the drawings and are particularly and distinctly pointed out and set forth in the appended claims.

Similar numerals refer to similar parts throughout the specification.

DESCRIPTION OF THE PREFERRED EMBODIMENTS

Figure 1:
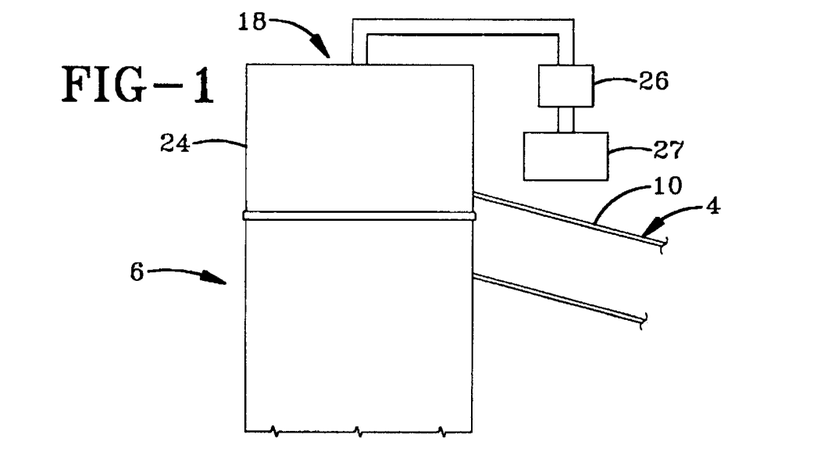
FIG. 1 is a front elevational view of a pre-existing conveyor apparatus prior to being retrofitted with the conveyor cleaning system of the present invention.

The first embodiment of the material transport system of the present invention is indicated generally at the numeral 2 in FIGS. 2–5. In the first embodiment, the teachings of the present invention are employed to retrofit a pre-existing material transport apparatus into material transport system 2 of the present invention. Such a pre-existing material transport apparatus that does not yet include the teachings of the present invention is indicated generally in FIG. 1 and includes a conveyor 4 and a head cover 6.

Figure 2:
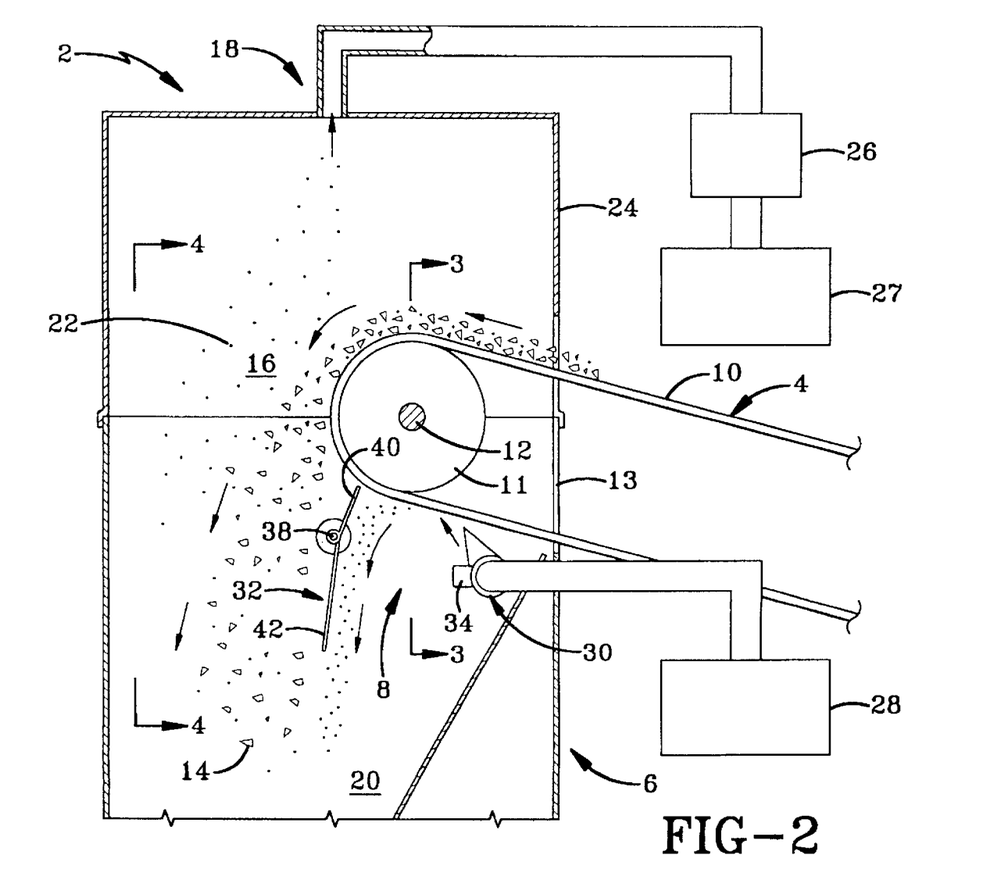
FIG. 2 is a front elevational view, partially cut away, of a first embodiment of the present invention.

As shown in FIG. 2, material transport system 2 includes conveyor 4, head cover 6, and a conveyor cleaning system 8. Material transport system 2 is a material handling system that permits materials to be transported by conveyor 4 such that the materials can be either transferred to a different conveyor or discharged into a packaging system or other collection or handling system. Conveyor cleaning system 8 removes residue from conveyor 4 and simultaneously reduces the quantity of air-borne residue that must otherwise be removed from the work environment.

Figure 3:
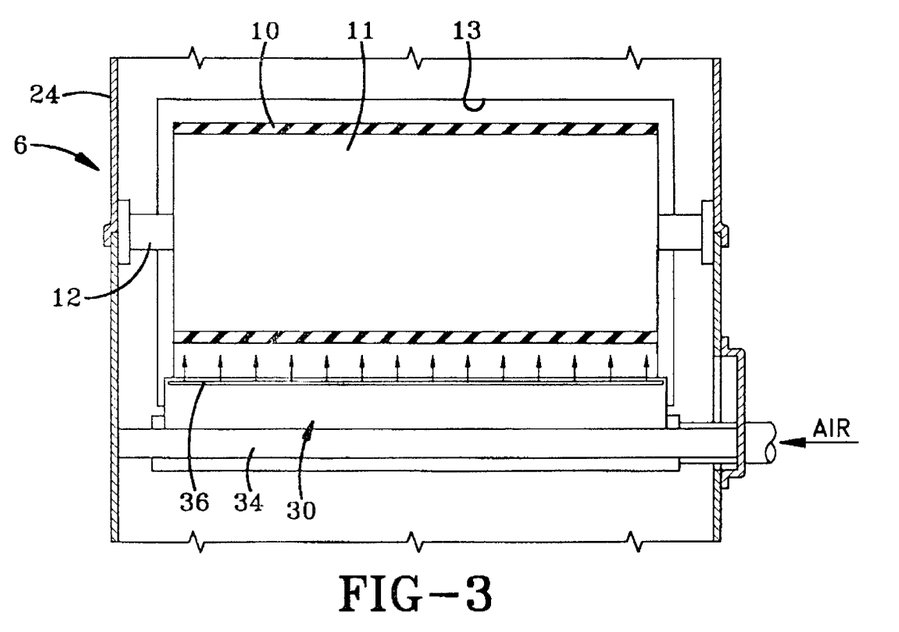
FIG. 3 is a sectional view as taken along line 3—3 of FIG. 2.
Figure 4:
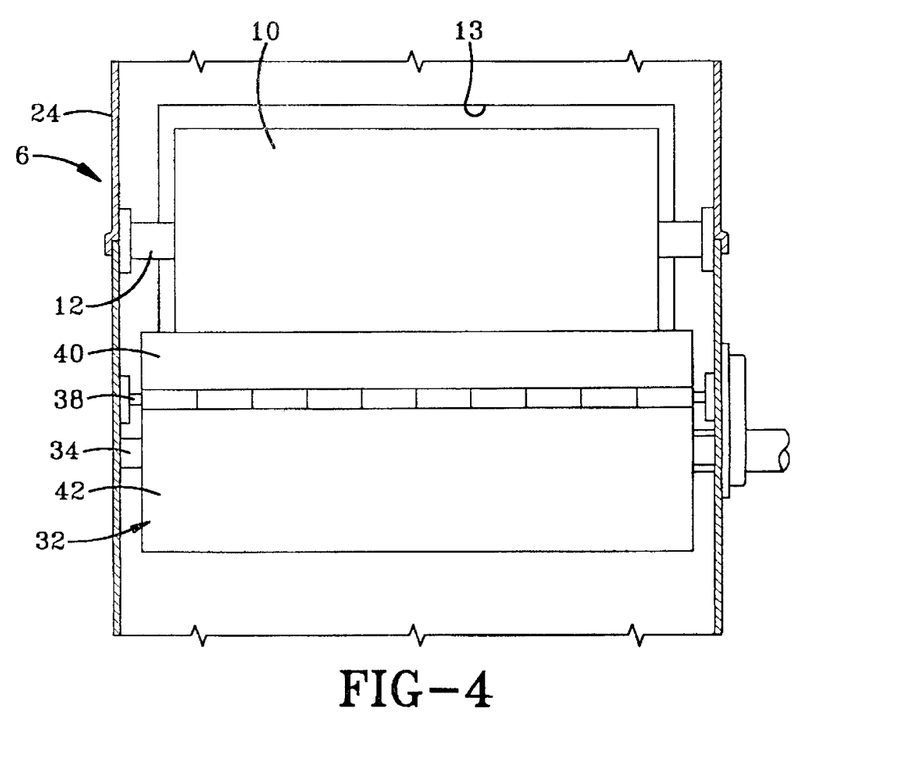
FIG. 4 is an end view as taken along line 4—4 of FIG. 2.

As can be seen in FIG. 2, conveyor 4 includes a conveyor 10 of the type known and understood in the relevant art and a head pulley 11 about which conveyor 10 turns. While conveyor 10 is depicted in the preferred embodiments to be an endless conveyor belt, it is understood that conveyor 10 may be any of a wide variety of conveyance devices of the type known and understood in the relevant art such as chain belts and feeders, vibrating feeder beds, foldable belts, as well as other such devices without departing from the spirit of the present invention. Head pulley 11 is rotatably mounted on an idler shaft 12 that is connected at opposite ends thereof to head cover 6 (FIGS. 3 and 4). Conveyor 10 extends through an entry opening 13 formed in head cover 6 such that head pulley 11 is disposed within head cover 6.

Conveyor 10 delivers a quantity of particulate material 14 from an initial location to a terminal location 16. Particulate material 14 may be any one of a variety of materials that require transportation by a material transport system such as coal, pet food, breakfast cereal, and the like. It can be seen in FIG. 2 that particulate material 14 is discharged from conveyor 10 at terminal location 16 which is disposed inside head cover 6. Particulate material 14 is thus discharged from conveyor 10 into the interior of head cover 6.

Head cover 6 includes an evacuation system 18 and a chute 20 attached to one another. As can be seen in FIG. 2, the discharge of particulate material 14 from conveyor 10 at terminal location 16 generates an amount of air-borne residue 22. As will be set forth more fully below, conveyor cleaning system 8 and evacuation system 18 both assist in removing air-borne residue 22 from within head cover 6 and help to prevent air-borne residue 22 from traveling out of entry opening 13 and into the workplace environment.

Evacuation system 18 includes a containment hood 24 disposed atop chute 20 and a vacuum source 26 that applies a vacuum or a reduced pressure to containment hood 24 to draw at least a portion of air-borne residue 22 into a waste receptacle 27. Vacuum source 26 is operatively connected with containment hood 24 by a series of ducts that allow air-borne residue 22 to be transported from containment hood 24 into waste receptacle 27 without contaminating the surrounding work environment.

Conveyor cleaning system 8 includes an air compressor 28, an air knife 30, and a deflector 32. Air compressor 28 is in fluid communication with air knife 30 and supplies air thereto to permit air knife 30 to remove residue from the surface of conveyor 10. Air compressor 28 is any of a wide variety of compressors and blowers of the type known and understood in the relevant art. While in the preferred embodiments air compressor 28 supplies air to air knife 30, it is understood that any other gas may be supplied to air knife 30 depending upon the requirements of the specific application. It is preferred that filters and desiccants of the type known and understood in the relevant art be interposed between air compressor 28 and air knife 30 to remove moisture, oil, and any other entrained materials that might be present in the air supplied by air compressor 28.

Air knife 30 is a hollow, elongated member that is supported inside head cover 6 by a brace 34 that is attached to the sides of head cover 6. Air knife 30 preferably extends at least the width of conveyor 10. Air knife 30 is formed with an elongated orifice 36 (FIG. 3) that directs an air stream at conveyor 10 to remove residue therefrom. Specifically, air knife 30 receives air from air compressor 28 and delivers a high velocity air stream through orifice 36 that impinges upon conveyor 10 at a location on conveyor 10 subsequent to the discharge of particulate material 14 at terminal location 16, yet still inside head cover 6. The air stream impinging on conveyor 10 from air knife 30 blasts the residue material from conveyor 10, thus cleaning conveyor 10. It is understood that air knife 30 may be disposed outside head cover 6 and oriented to direct the air stream through entry opening 13 into the interior of head cover 6 to impinge upon conveyor 10 without departing from the spirit of the present invention.

The air stream impinging on conveyor 10 also has the tendency to dry the surface of conveyor 10. The drying of conveyor 10 reduces the amount of residue that is carried by conveyor 10, thus making conveyor 10 easier to clean with the air stream delivered by air knife 30.

Deflector 32 is adjustably mounted inside head cover 6 by a shaft 38 that is mounted to the sides of head cover 6. Deflector 32 includes an upper plate 40 extending in a generally upward direction from shaft 38 and a lower plate 42 extending in a generally downward direction from shaft 38. As is best shown in FIG. 2, upper and lower plates 40 and 42 are not coplanar, and rather include an obtuse angle therebetween in the direction of air knife 30. It is understood, however, that in other embodiments deflector 32 may be a single substantially planar plate of material. Deflector 32 is manufactured out of thin plates of a strong, semi-rigid material such as plastic or metal, and is preferred to be nonreactive with particulate material 14.

When deflector 32 is oriented such that the uppermost edge of upper plate 40 is very close to conveyor 10 and is only slightly spaced therefrom, the air stream exiting orifice 36 that impinges against conveyor 10 and blasts the residue from conveyor 10 thereafter strikes deflector 32 and is directed in a generally downward direction. Inasmuch as the residue that has been blasted from conveyor 10 by the air stream is now air-borne, such blasted residue travels with the air stream that has been redirected by deflector 32 in a generally downward direction. In accordance with the features of the present invention, therefore, deflector 32 directs the residue removed from conveyor 10 downward toward chute 20 instead of upward toward containment hood 24 where it otherwise would be removed by vacuum source 26 and deposited in waste receptacle 27.

As can be seen in FIG. 2, upper plate 40 forms a first angle with conveyor 10. As set forth above, lower plate 42 makes an obtuse angle with upper plate 40. The air stream thus exits orifice 36 of air knife 30, impinges upon conveyor 10 where it dislodges residue therefrom, makes a first downward turn as it is redirected by upper plate 40, and then makes another downward turn as it is directed by lower plate 42 in the direction of chute 20. Inasmuch as the air stream carries the residue that it has blasted from conveyor 10, the gradual transitions in the flow of the air stream from conveyor 10 toward chute 20 caused by upper and lower plates 40 and 42 help to ensure that the air-borne residue carried in the air stream is directed into chute 20 instead of being turbulently carried into containment hood 24. The smooth transition provided by upper and lower plates 40 and 42 thus increases the quantity of residue that is recycled for use by being deposited in chute 20.

The smooth redirection of the air stream by deflector 32 toward chute 20 provides additional benefits by reducing the quantity of air-borne residue that exists in containment hood 24. Specifically, the smooth redirection of the air stream by deflector 32 toward chute 20 causes the air in the vicinity of the air stream to be generally siphoned by the air stream in the direction of its flow, i.e., toward chute 20. The flow of the air stream carrying the dislodged residue from conveyor 10 thus also causes additional air-borne residue floating in containment hood 24 to be drawn downward toward chute 20.

The downward flow of the air stream causes the particles of residue removed from conveyor 10 and the air-borne residue drawn from containment hood 24 to become supersaturated and to collide with one another causing the particles of residue to stick to one another and form larger macro-particles that are too heavy to remain suspended in the air stream. Such macro-particles precipitate out of the air stream and are directed toward chute 20 along with particulate material 14.

While the air stream has a tendency to draw at least a portion of the air-borne residue floating in containment hood 24 toward chute 20, vacuum source 26 nevertheless draws at least a portion of the air-borne residue in the upward direction, which is generally in a direction opposite the flow of particulate material 14 as it is falling toward chute 20. Such upward flow caused by vacuum source 26 causes the air-borne residue to collide with individual particles of particulate material 14 with the result that at least a portion of the air-borne residue settles onto particulate material 14. Such settled residue is delivered to chute 20 along with particulate material 14 instead of being vacuumed away by vacuum source 26.

In accordance with the objectives of the present invention, therefore, the combination of air knife 30 and deflector 32 causes the residue from conveyor 10 as well as at least a portion of the air-borne residue resident in head cover 6 to be directed into chute 20 with particulate material 14. The residue material directed into chute 20 by conveyor cleaning system 8 thus reduces cost by recycling additional quantities of residue and by reducing the quantity of air-borne residue that must be evacuated by vacuum source 26.

Such savings become especially significant when particulate material 14 is a powdered material, such as powdered lime. A system such as conveyor cleaning system 8 that reduces the residue present in the work area, that reduces the air-borne residue that must be evacuated, and that increases the amount of residue that is recycled and packaged dramatically improves the working environment and provides substantial cost benefits.

Figure 5:
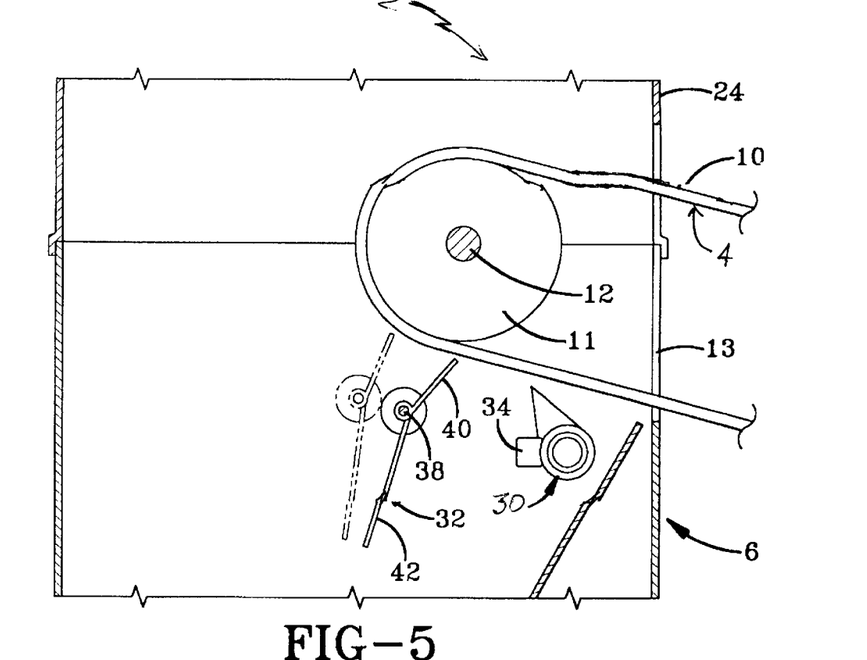
FIG. 5 is a front elevational view, partially in section, of a portion of the first embodiment showing adjustment of the deflector.

As can be seen in FIG. 5, the position of deflector 32 is rotationally and translationally adjustable with respect to air knife 10. More specifically, deflector 32 is mounted on shaft 38, and shaft 38 is rotatable about its own axis and is translatable with respect to air knife 30. Shaft 38 can be rotated to adjust the angle between upper plate 40 and conveyor 10. Such rotational adjustment of deflector 32 adjusts the angle with which deflector 32 redirects the air stream after it has impinged upon conveyor 10. Additionally, shaft 38 is translatable between a proximate position that is relatively closer to air knife 30 and a distal position that is relatively farther away from air knife 30. The adjustability of deflector 32 between proximate and distal positions permits adjustability of the point at which deflector 32 redirects the air stream after its impingement upon conveyor 10. Inasmuch as the rotational position of deflector 32 is adjustable, and inasmuch as it is preferred that the uppermost edge of deflector 32 be closely adjacent conveyor 10, shaft 38 is at least nominally adjustable in the vertical direction to permit deflector 32 to be disposed closely adjacent conveyor 10 after the rotational position of deflector 32 has been adjusted.

Once deflector 32 is favorably adjusted, the position of deflector 32 is maintained by known structures that affix shaft 38 to the sides of head cover 6. The position of deflector 32 is adjusted by at least partially releasing the fastening structures that affix shaft 38 to sides of head cover 6 and adjusting deflector 32, both rotationally and translationally, to the desired position. In this regard, it is understood that such adjustability of deflector 32 is desirable inasmuch as varying atmospheric conditions such as ambient pressure and humidity can necessitate adjustment of deflector 32 to ensure the reliable removal of the residue from conveyor 10 and the air-borne residue from the air surrounding conveyor 10 into chute 20. Moreover, adjustability of deflector 32 is desirable inasmuch as material transport system 2 may be used to transport different particulate materials 14 at different times, or alternatively may be employed to transport a certain type of particulate material 14 at varying speeds based upon production requirements. In either circumstance, the velocity of the air stream delivered by air knife 30 may require adjustment, thus likewise necessitating adjustment of deflector 32.

Conveyor cleaning system 2 thus removes residue from conveyor 10 and directs the removed residue, as well as at least a portion of the air-borne residue disposed within head cover 6, toward chute 20. The air-borne residue transported by the air stream forms macro-particles that fall out of air suspension. Additionally, at least a portion of the transported air-borne residue settles out of air suspension onto individual particles of particulate material 14. In accordance with the objectives of the present invention, conveyor cleaning system 2 removes residue from conveyor 10 and additionally reduces the quantity of air-borne residue within head cover 6.

Figure 6:
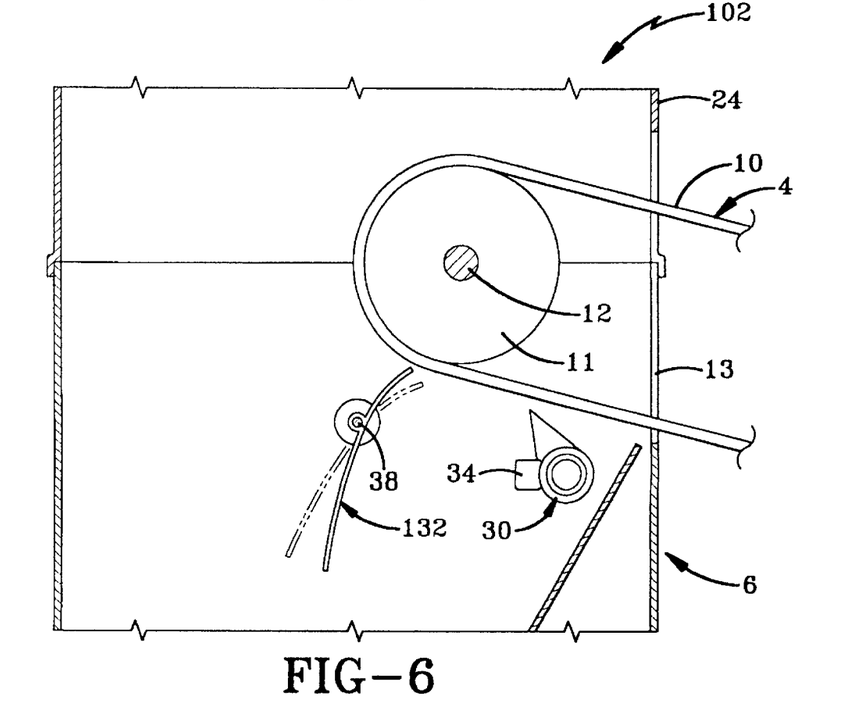
FIG. 6 is a view similar to FIG. 5, depicting a second embodiment of the material transport system of the present invention.

A second embodiment of the present invention is indicated generally at the numeral 102 in FIG. 6. Material transport system 102 is similar to material transport system 2, except that deflector 132 is curved instead of including planar upper and lower plates 40 and 42. Thus, the air stream makes a smooth transition from conveyor 10 toward chute 20 without having to make multiple turns from conveyor 10 to upper plate 40 and to lower plate 42.

Figure 7:
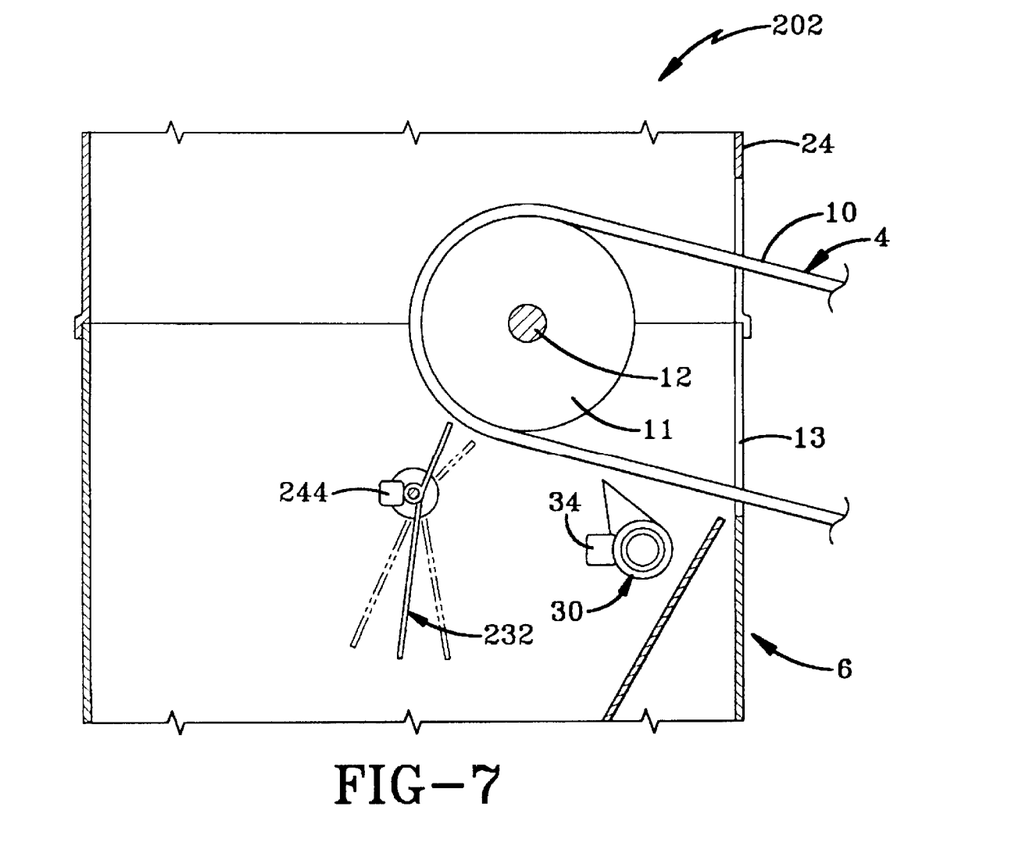
FIG. 7 is a view similar to FIG. 5, depicting a third embodiment of the material transport system of the present invention.

A third embodiment of the present invention is indicated generally at the numeral 202 in FIG. 7. Material transport system 202 is similar to material transport system 2, except that material transport system 202 additionally includes an automatic adjustment mechanism 244 mounted on deflector 232 that automatically effects the adjustment of deflector 232 without requiring that the fixture structures that retain shaft 38 against the sides of head cover 6 be loosened prior to adjustment and then retightened after the adjustment has been completed. Adjustment mechanism 244 thus permits the position of deflector 232 to be readily adjusted with minimal downtime.

Figure 8:
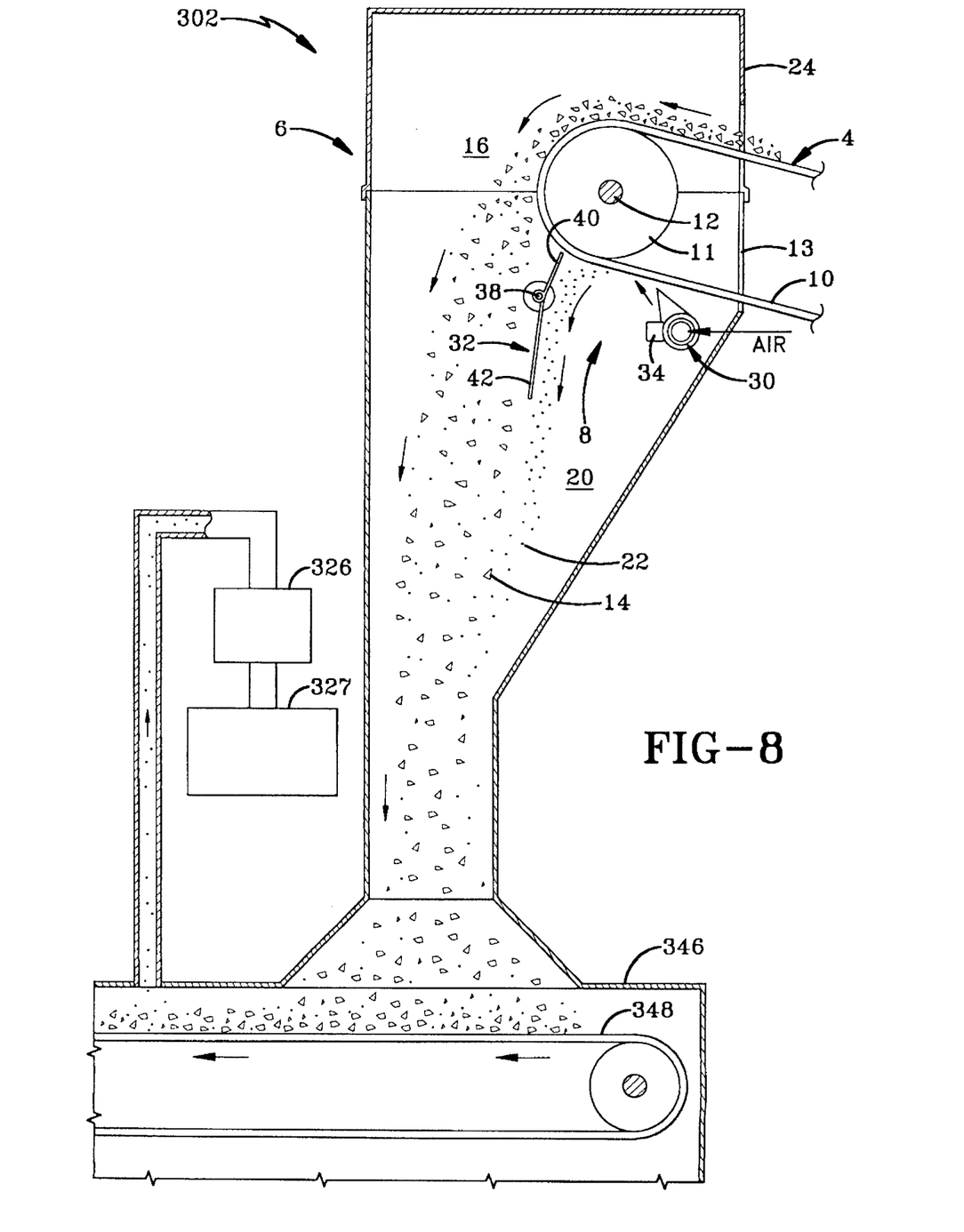
FIG. 8 is a front elevational view with portions shown in section of a fourth embodiment of the material transport system of the present invention.

A fourth embodiment of the material transport system of the present invention is indicated generally at the numeral 302 in FIG. 8. Material transport system 302 is similar to material transport system 2, except that conveyor cleaning system 8 is incorporated into a new material transport system instead of being used to retrofit a pre-existing system. In material transport system 302, chute 20 terminates at a shroud 346 that surrounds a second conveyor 348. Particulate material 14 is discharged from conveyor 10, travels through chute 20, and is delivered onto second conveyor 348. Shroud 346 extends along at least a portion of second conveyor 348 in the downstream direction that particulate material 14 is carried. Any remaining air-borne residue is retained by shroud 346 in the vicinity surrounding second conveyor 348. Vacuum source 326 and waste receptacle 327 are operatively connected to the downstream portion of shroud 346 instead of being operatively connected with containment hood 24.

In operation, particulate material 14 is discharged from conveyor 10 and is directed through chute 20 after which it falls onto second conveyor 348. Air knife 30 impinges the air stream on conveyor 10, thus blasting loose the residue carried by conveyor 10. The air stream and air-borne residue carried by the air stream are redirected downward by deflector 32 in a direction toward chute 20 and second conveyor 348. The redirected air stream thus causes a downward air flow that carries both the air-borne residue that has been blasted away by the air stream from air knife 30 as well as the air-borne residue that is floating within containment hood 24.

As indicated hereinbefore, this downward air flow through chute 20 causes the air-borne residue to become supersaturated and form macro-particles that precipitate out of air suspension and thus fall onto second conveyor 348 where they are re-incorporated with particulate material 14. By causing all of the air-borne residue to flow in the general direction that particulate material 14 travels, material transport system 302 thus precipitates a substantial portion of the air-borne residue out of suspension within head cover 6 and additionally provides an opportunity for the remaining non-precipitated air-borne residue to settle onto individual particles of particulate material 14 disposed on second conveyor 348. Any remaining air-borne residue that has not been precipitated and has not settled out of suspension by the time the air-borne residue has reached the downstream end of shroud 346 is vacuumed away by vacuum source 326 and deposited into waste receptacle 327. By operatively connecting vacuum source 326 with the downstream edge of shroud 346, the air-borne residue flows in the same direction that particulate material 14 travels, and thus provides an opportunity for air-borne residue either to precipitate out of suspension or to settle out of suspension. As such, material transport system 302 reduces the quantity of air-borne residue that must be evacuated by vacuum source 326.

While in certain circumstances the residue collected in waste receptacle 327 can be reintroduced into particulate material 14, such reintroduction requires handling labor and thus cost, and additionally results in the regeneration of air-borne residue. Material transport system 302 thus provides the greatest opportunity for air-borne residue to be reincorporated into particulate material 14 via precipitation and settling without being vacuumed away for subsequent reintroduction.

Accordingly, the improved conveyor cleaning system apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the conveyor cleaning system is constructed and used, the characteristics of the construction, and the advantageous new and useful results obtained; the new and useful structures, devices, elements, arrangements, parts, and combinations are set forth in the appended claims.

I claim:

1. In a material transport system of the type having a conveyor operatively terminating inside a head cover, the head cover including a chute, the improvement comprising:
   a vacuum source operatively connected to the head cover;
   a source of air;
   an air knife;
   the source of air being in fluid communication with the air knife, the source of air adapted to supply air to the air knife;
   the air knife being operatively directed at the conveyor, the air knife impinging an air stream onto the conveyor; and
   a deflector, the deflector being disposed at an angle with respect to the conveyor, the deflector redirecting the air stream toward the chute after the air stream has impinged on the conveyor.

2. The improvement as set forth in claim 1 wherein the deflector includes at least a first plate and wherein said first plate is curved, the deflector is adjustable between proximate and distal positions, and the angle between the deflector and the conveyor is adjustable.

3. The improvement as set forth in claim 1, wherein the angle between the deflector and the conveyor is adjustable.

4. The improvement as set forth in claim 1, wherein the air knife is formed with an orifice.

5. The improvement as set forth in claim 4, wherein the air knife is formed with an elongated orifice.

6. The improvement as set forth in claim 1, wherein the deflector includes at least a first plate.

7. The improvement as set forth in claim 6, wherein the deflector is mounted on the head cover.

8. The improvement as set forth in claim 6, wherein the deflector includes a second plate, the second plate being non-coplanar with the at least first plate.

9. The improvement as set forth in claim 6, wherein the at least first plate is substantially planar.

10. The improvement as set forth in claim 6, wherein the at least first plate is curved.

11. The improvement as set forth in claim 6, wherein the deflector is adjustable between proximate and distal positions.

12. A material transport system for discharging particulate material at a terminal location, the material transport system comprising:
   a conveyor;
   a head cover surrounding at least a portion of the conveyor;
   the head cover including a chute, the chute adapted to receive the particulate material after its discharge from the conveyor;
   a vacuum source operatively connected to the head cover;
   a source of air;
   an air knife;
   the source of air being in fluid communication with the air knife, the source of air adapted to supply air to the air knife;
   the air knife being disposed adjacent the head cover and directed at the conveyor, the air knife impinging an air stream onto the conveyor; and
   a deflector, the deflector redirecting the air stream toward the chute after the air stream has impinged on the conveyor.

13. The material transport system as set forth in claim 12, wherein the air knife is disposed within the head cover.

14. The material transport system as set forth in claim 12 wherein the deflector includes at least a first plate and wherein said first plate is curved, the deflector is adjustable between proximate and distal positions, and the angle between the deflector and the conveyor is adjustable.

15. The material transport system as set forth in claim 12, wherein the deflector includes at least a first plate.

16. The material transport system as set forth in claim 15, wherein the at least first plate is substantially planar.

17. The material transport system as set forth in claim 15, wherein the at least first plate is curved.

18. The material transport system as set forth in claim 15, wherein the deflector further includes a second plate.

19. The material transport system as set forth in claim 12, further comprising a shroud connected to the chute.

20. The material transport system as set forth in claim 19, further comprising an evacuation system operationally connected to the shroud.

21. The material transport system as set forth in claim 20, further comprising a second conveyor, the second conveyor extending at least partially into the shroud.

22. A method for removing residue from a conveyor operatively terminated inside a head cover including a chute, the method comprising the steps of:
   providing a vacuum source operatively connected to the head cover;
   impinging an air stream onto the conveyor with an air knife; and
   redirecting the air stream with a deflector after the air stream has impinged on the conveyor.

23. The method as set forth in claim 22 wherein the deflector includes at least a first plate and wherein said first plate is curved, the deflector is adjustable between proximate and distal positions, and the angle between the deflector and the conveyor is adjustable.

24. A material transport system for discharging particulate material at a terminal location, the material transport system comprising:
   a conveyor;
   a shroud cover surrounding at least a portion of the conveyor;
   the shroud cover including a chute, the chute adapted to receive the particulate material after its discharge from the conveyor;
   a vacuum source operatively connected to the shroud cover;

a source of air;

an air knife;

the source of air being in fluid communication with the air knife, the source of air adapted to supply air to the air knife;

the air knife being disposed adjacent the head cover and directed at the conveyor, the air knife impinging an air stream onto the conveyor; and a deflector, the deflector redirecting the air stream toward the chute after the air stream has impinged on the conveyor.

25. The material transport system as set forth in claim 24 wherein the deflector includes at least a first plate and wherein said first plate is curved, the deflector is adjustable between proximate and distal positions, and the angle between the deflector and the conveyor is adjustable.

26. A method for removing residue from a conveyor operatively terminated inside a shroud cover including a chute, the method comprising the steps of:

providing a vacuum source operatively connected to the shroud cover;

impinging an air stream onto the conveyor with an air knife; and redirecting the air stream with a deflector after the air stream has impinged on the conveyor.

27. The method as set forth in claim 26 wherein the deflector includes at least a first plate and wherein said first plate is curved, the deflector is adjustable between proximate and distal positions, and the angle between the deflector and the conveyor is adjustable.

* * * * *